United States Patent [19]

Odermatt et al.

[11] Patent Number: 5,332,585
[45] Date of Patent: Jul. 26, 1994

[54] PREPARATION OF A GRANULAR FOOD PRODUCT

[75] Inventors: Robert G. Odermatt, Frauenfeld; David Roeschli, Pfungen, both of Switzerland

[73] Assignee: Nestec S.A., Vevey, Switzerland

[21] Appl. No.: 795,766

[22] Filed: Nov. 21, 1991

[30] Foreign Application Priority Data

Dec. 7, 1990 [CH] Switzerland .................. 3878/90

[51] Int. Cl.⁵ ............................................. A23L 1/0522
[52] U.S. Cl. ................................. 426/96; 426/99; 426/589; 426/516; 426/517; 426/518
[58] Field of Search ............ 426/589, 516, 517, 518, 426/96, 99

[56] References Cited

U.S. PATENT DOCUMENTS

| | | | |
|---|---|---|---|
| 3,433,650 | 3/1969 | Block et al. | 426/589 |
| 3,652,299 | 3/1972 | Penton | 426/589 |
| 3,667,306 | 9/1971 | McMichael | 426/589 |
| 3,769,029 | 10/1973 | Ganz | 426/589 |
| 3,958,031 | 5/1976 | Fleck et al. | 426/589 |
| 4,060,645 | 11/1977 | Risler et al. | 426/589 |
| 4,363,824 | 12/1982 | Willi et al. | 426/589 |
| 4,578,274 | 3/1986 | Sugisawa et al. | 426/589 |
| 4,612,203 | 9/1986 | Wong et al. | 426/589 |
| 4,615,899 | 10/1986 | Hunter et al. | 426/589 |
| 4,844,938 | 7/1989 | Amamoto et al. | 426/589 |
| 5,145,705 | 9/1992 | Seeds | 426/589 |

FOREIGN PATENT DOCUMENTS

| | | |
|---|---|---|
| 0129235A2 | 11/1984 | European Pat. Off. |
| 1602733 | 1/1971 | France |
| 2205475A | 12/1988 | United Kingdom |

OTHER PUBLICATIONS

European Search Report For EP 91118878, Feb. 18, 1992.

*Primary Examiner*—Jeanette Hunter
*Attorney, Agent, or Firm*—Vogt & O'Donnell

[57] ABSTRACT

A granular food product is prepared by mixing a molten fat with an amylaceous material, extruding the mixture in strands, cooling the strands and then subdividing them into sections and projecting the sections through a grill to size-reduce the sections into granules.

14 Claims, 3 Drawing Sheets

PREPARATION OF A GRANULAR FOOD PRODUCT

BACKGROUND OF THE INVENTION

This invention relates to production of granules of a food base for sauces and soups from an amylaceous material and a fat.

French Patent No. 1 602 733 describes a process for the production of powder-form mixtures of fats and powder-form supports using a heatable mixer comprising a rotating blade and an exit grill. This document clearly illustrates the difficulties involved in avoiding the formation of non-dissociable lumps when the proportion of fat in the mixture becomes large.

European Patent No. 29 153 describes a process for the production of a food base instantly dispersible in boiling water, in which a mixture of amylaceous material and molten fat is applied to a cooling drum or belt and the solidified mixture is detached by a blade so that the product obtained is in the form of flakes.

The problem addressed by the present invention was to provide a process and an apparatus for the simple and reproducible production of a food base for sauces and soups from an amylaceous material and a fat which would be present in the form of free-flowing granules.

SUMMARY OF THE INVENTION

The process according to the invention for the production of granules of a food base for sauces and soups from an amylaceous material and a fat is characterized in that
i) the fat is melted and the amylaceous material and the molten fat are mixed,
ii) the mixture is extruded in the form of strands,
iii) the strands are hardened by cooling and are subdivided into sections and
iv) the strand sections are size-reduced to granules by projection through a grill.

Similarly, the apparatus for carrying out the process according to the invention is characterized by
i) a unit for heating a fat and a unit for mixing an amylaceous material and molten fat,
ii) a unit for extruding the mixture in the form of strands,
iii) a unit for cooling and subdividing the strands into sections and
iv) a unit for granulating the strand sections.

DETAILED DESCRIPTION OF THE INVENTION

The process and apparatus according to the invention enable a food base to be produced from an amylaceous material and a fat in the form of free-flowing granules which are dispersible in boiling water and which are thus suitable for the convenient preparation of thickened sauces and soups.

The process according to the invention starts out from an amylaceous material, such as a cereal flour, either on its own or in admixture with an addition of starch, such as for example corn starch, potato starch, wheat starch, rice starch or tapioca starch. Other thickening agents, such as for example guar gum or pectin or even gelatine, may optionally be added. It is even possible directly to add agents traditionally included in the composition of dehydrated sauces and soups, such as for example flavoring agents, flavor enhancers, particularly sodium glutamate, colorants, cooking salt, spices, meat or yeast extract, hydrolyzed proteins or sugar. However, the total quantity of these added agents should represent a relatively low or minor proportion by weight of the amylaceous material.

In one preferred embodiment of the process according to the invention, a predried wheat flour having a residual moisture content of 3 to 10% is used as the amylaceous material. It is also possible to use a non-predried wheat flour having a moisture content of approximately 12 to 17% and to include a heating phase in which a significant proportion of this moisture is vaporized in cases where it is desired to produce a sauce base of the "roux" type.

The choice of the fat is dictated on the one hand by organoleptic considerations for which it should not remain solid or solidify at an excessively high temperature and, on the other hand, by practical transport, storage and handling considerations for which it should not melt at ambient temperature. Thus, the fat selected is preferably a fat, particularly a peanut or palm fat, which has a clear point of approximately 35° to 50° C. and preferably of the order of 44° to 48° C.

The process according to the invention is particularly suitable for the production of free-flowing granules of a food base relatively rich in fat. Thus, in step i) of the process according to the invention, the amylaceous material and the fat are preferably mixed in a ratio by weight of approximately 75:25 to 50:50 and preferably of the order of 65:35 to 55:45.

This mixing step is preferably carried out in a double-jacketed, single or twin horizontal mixing screw. This is because, although the mixing temperature is determined mainly by the temperature of the fat, which is preferably melted at around 50° to 60° C., and by the temperature of the amylaceous material which is preferably ambient temperature, it is of advantage to be able finely to adjust the temperature of the mixture before extrusion. It can thus be given an optimal texture which does not offer excessive resistance to extrusion while giving the strands sufficient firmness.

In step ii) of the process according to the invention, the mixture is preferably extruded in the form of cylindrical strands approximately 3 to 10 mm in diameter, more particularly by forcing it through an extrusion unit preferably comprising a deflection chamber provided at a downstream end of the mixing screw and communicating with a row of vertical extrusion tubes which may thus have an internal diameter of 3 to 10 mm for example.

In step iii) of the process according to the invention, cooling of the strands is preferably carried out by arrangement of the strands on an upper conveyor belt where, for example, they are either sprinkled with liquid nitrogen, particularly through suitable sprinkling means such as spray nozzles, or exposed to a stream of cold air or even contacted with a cooled surface of the belt itself. The strands may be subdivided into sections by allowing them to drop onto at least one lower conveyor belt of which an upstream end may be positioned below a downstream end of the upper belt. To ensure that the strands, subdivide, in other words break, into separate, relatively short sections, more particularly having a length of about 5 to 10 cm sufficient for the granulation step iv), it is important on the one hand that the strands disposed on the upper conveyor belt do not adhere excessively to the belt and, on the other hand, that they do not adhere to one another on the belt.

It is for this reason that it is advisable to adjust the temperature of the mixture of amylaceous material and fat to a value just sufficient for the mixture to be extrudable, the extruded strands thus having a sufficiently firm texture to retain their cylindrical shape and not to collapse on the belt. This may be achieved by precisely adjusting the temperature of a liquid circulating in the double jacket of the mixing screw or even in a cooling enclosure which may surround the vertical tubes over at least part of their length.

It is also for this reason that, in the apparatus according to the invention, a generally vertical comb may be provided in ii) at a distance from and adjacent the row of vertical tubes, each tooth of the comb having a free end curved towards the horizontal and terminating level with an outlet orifice of an extrusion tube. By means of such a comb, it is possible to detach any drops of oil adhering to the strands which could promote adhesion of the strands to one another and to the upper belt.

In step iv) of the process according to the invention, the strand sections are preferably size-reduced, in other words granulated, by outward projection through a fixed cylindrical grill by means of a coaxial set of rotating blades provided inside the grill. The strands are thus size-reduced into cylindrical granules 1 to 5 mm in diameter and 2 to 10 mm long with an apparent density of approximately 400 to 600 g/l by projection through a grill thus having round holes between 1 and 5 mm in diameter.

This method of carrying out step iv) of the process according to the invention and the corresponding unit of the apparatus according to the invention have proved to be particularly effective because they provide for clean operation in a simple, prolonged, constant and reproducible manner with no danger of the grill being obstructed by deposits of fatty mixture. This success appears attributable to the fact that it is thus possible to pass the hardened strands through the grill so to speak at one go.

The apparatus for carrying out the process according to the invention is described in more detail hereinafter with reference to the accompanying drawings.

DETAILED DESCRIPTION OF THE DRAWINGS

Figure 1:
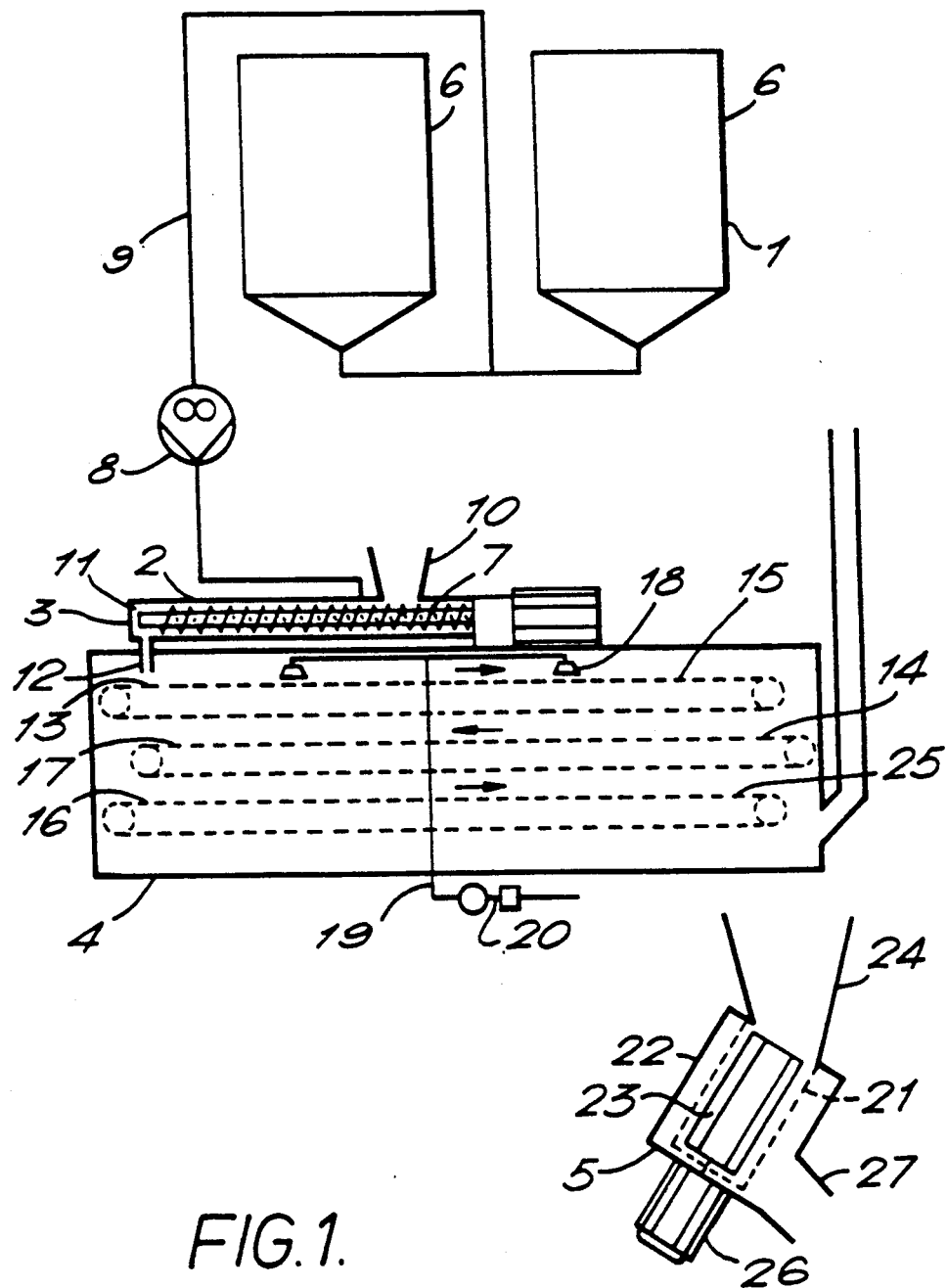
FIG. 1 schematically illustrates one embodiment of the apparatus as a whole.

As can be seen from FIG. 1, the apparatus for carrying out the process according to the invention comprises
i) a unit 1 for heating a fat and a unit 2 for mixing an amylaceous material and molten fat,
ii) a unit 3 for extruding the mixture in the form of strands,
iii) a unit 4 for cooling and subdividing the strands into sections and
iv) a unit 5 for granulating the strand sections.

In i), the unit 1 for heating a fat comprises several electrically heated metal tanks 6. The unit 2 for mixing an amylaceous material and molten fat comprises a double-jacketed horizontal twin mixing screw 7. A pipe 9 connects the heating unit 6 to the mixing unit 2 through a metering pump 8 for molten fat. The pipe 9 opens above the twin screw 7 downstream of a feed hopper 10 for amylaceous material.

Figure 2:
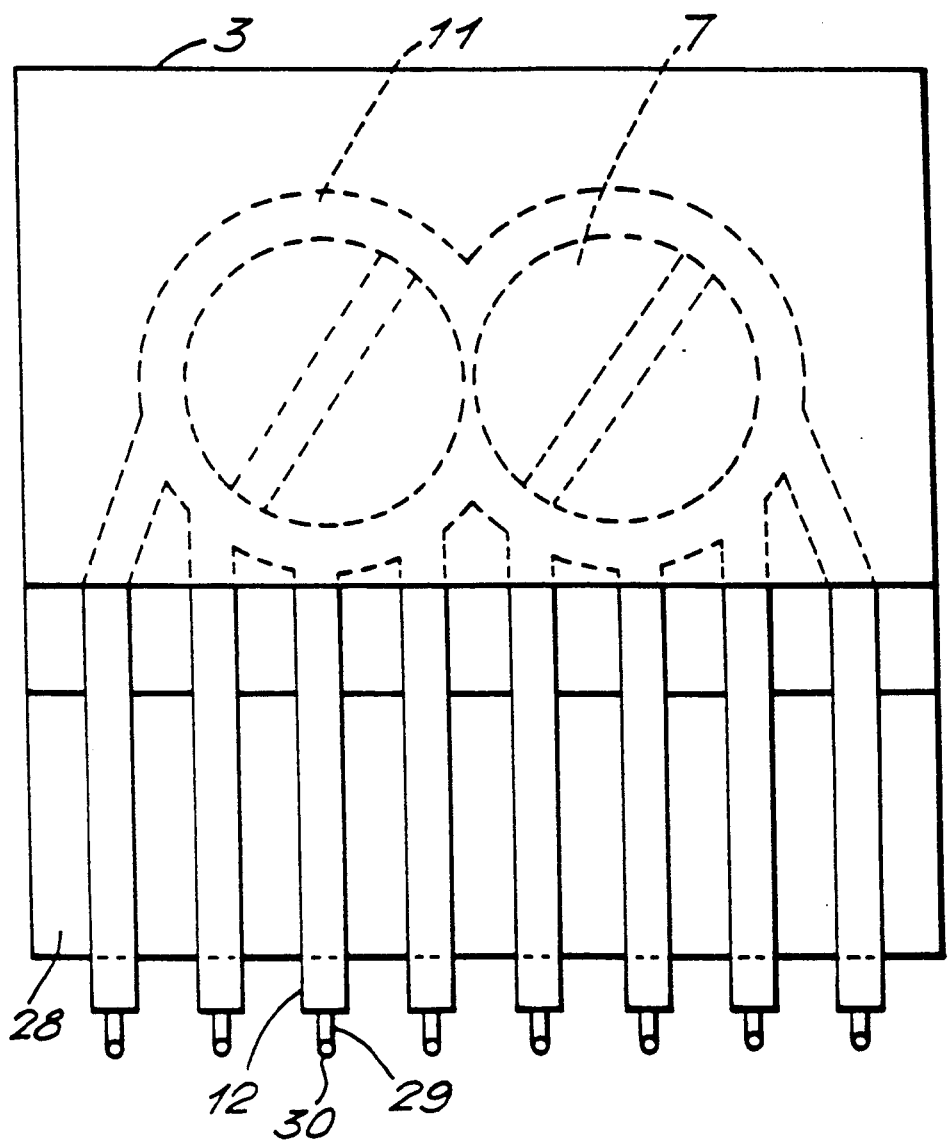
FIG. 2 is a front elevation of one embodiment of the extrusion unit of the apparatus.
Figure 3:
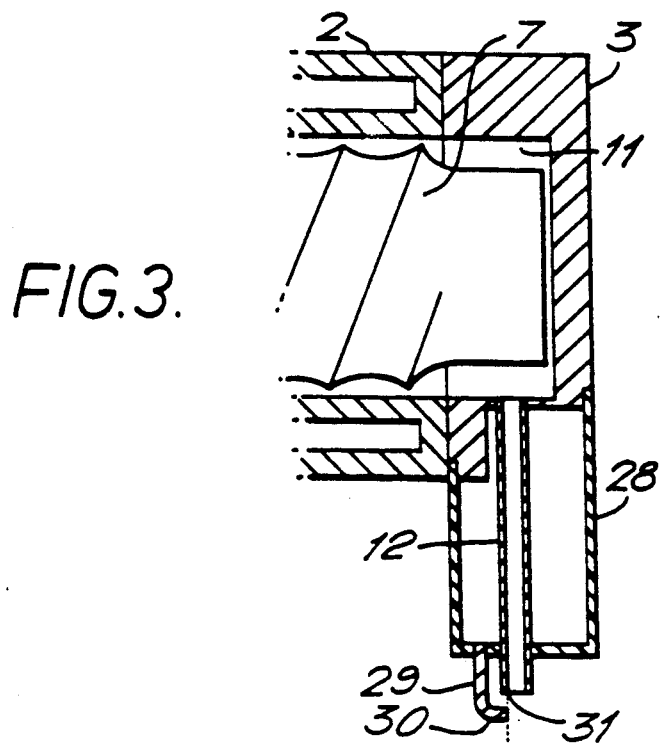
FIG. 3 is a side elevation, partly in section, of the extrusion unit shown in FIG. 2.

In ii) and as can be seen in more detail in FIGS. 2 and 3, the extrusion unit 3 comprises a deflection chamber 11 provided at the downstream end of the mixing screw 7 and communicating with a row of vertical extrusion tubes 12. The extrusion unit also comprises a cooling enclosure 28 which surrounds the vertical tubes 12 over the greater part of their length and through which the same liquid used to adjust the temperature of the double jacket of the mixing screw 7 can be circulated. Finally, the extrusion unit comprises a generally vertical comb arranged at a distance from and adjacent the row of vertical tubes 12, each tooth 29 of the comb having a free end 30 curved towards the horizontal and terminating level with the outlet orifice 31 of an extrusion tube 12.

In iii), the unit 4 for cooling and subdividing the strands comprises an upper conveyor belt of which the upstream end 13 is situated below the row of extrusion tubes 12, a first lower conveyor belt of which the upstream end 14 is situated below the downstream end 15 of the upper conveyor belt, a second lower conveyor belt of which the upstream end 16 is situated below the downstream end 17 of the first lower conveyor belt and means for sprinkling liquid nitrogen in the form of spray nozzles 18 arranged above the upper conveyor belt and fed by a pipe 19 connecting them to a reservoir (not shown) via a flow and pressure regulator 20.

Figure 4:
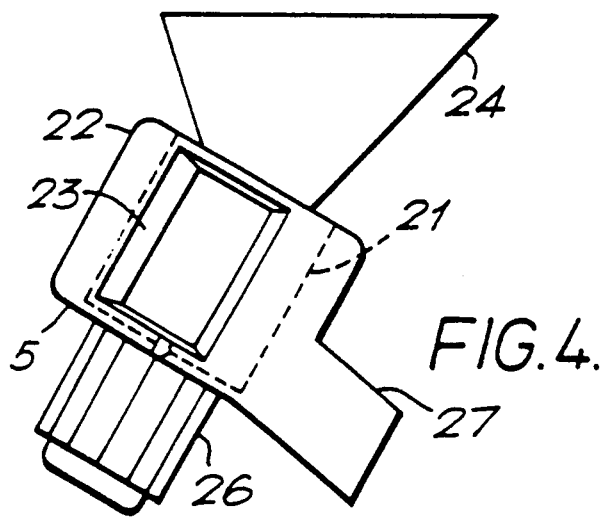
FIG. 4 is a schematic view, partly in section, of the granulation unit of the apparatus.
Figure 5:
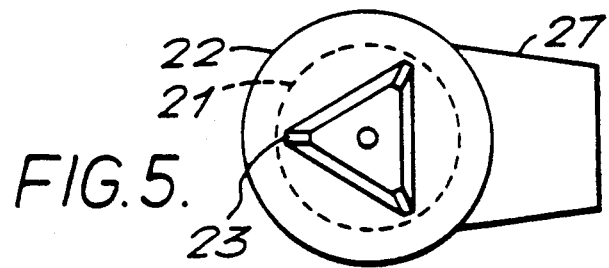
FIG. 5 is a plan view of the granulation apparatus shown in FIG. 4.

In iv) and as can be seen in more detail in FIGS. 4 and 5, the unit 5 for granulating the strand sections comprises a fixed cylindrical grill 21, a coaxial jacket 22 outside the grill and a coaxial set of rotating blades 23 inside the grill. A feed hopper 24 for strand sections is provided below the downstream end 25 of the second lower conveyor belt and communicates with the open upper end of the cylindrical grill 21. A powerful motor 26 drives the set of rotating blades 23. Finally, a discharge channel 27 for the granules is provided below and communicates with the space left free between the grill 21 and the outer coaxial jacket 22.

One embodiment of the process according to the invention is illustrated in the following Example in which percentages and parts are by weight.

EXAMPLE

Granules of a food material for the instant preparation of a "roux" are produced in an apparatus similar to that shown in the drawing. To this end,
i) a hydrogenated palm fat having a clear point of approximately 48° C. is melted at around 55° C.
40% molten fat and 60% predried wheat flour having a temperature of approximately 20° C. and a residual moisture content of approximately 5% are mixed, the screws of the twin-screw mixing unit rotating at approximately 210 r.p.m.
ii) The mixture is extruded in the form of cylindrical strands approximately 6 mm in diameter, the tubes of the extrusion unit having an internal diameter of 6 mm.
The temperature of the cooling liquid of the mixing unit and of the cooling enclosure of the extrusion tubes is finely adjusted so that, taking into account the heating of the mixture by friction in these units, the extruded strands have a temperature of approximately 38° to 39° C. At this temperature, the mixture is still extrudable and the extruded strands have a sufficiently firm texture to retain their cylindrical shape and not to collapse on the upper conveyor belt of the cooling unit on which they are disposed.

iii) The strands are cooled by sprinkling with liquid nitrogen. To this end, approximately 0.2 kg liquid nitrogen per kg strands are sprayed above the upper conveyor belt. The cylindrical strands then break into sections approximately 5 to 10 cm in length by dropping from the upper belt onto the first lower conveyor belt. During their transport on the first and second lower belts, the strand sections are still exposed to the cooling effect applied by the nitrogen vapors descending from the upper belt. They have a temperature of approximately 30° to 34° C. on leaving the cooling unit.

iv) The strand sections are size-reduced to cylindrical granules approximately 2 mm in diameter and approximately 2 to 10 mm long by introduction into the granulation unit where they are projected outwards through the fixed cylindrical grill which has round holes 2 mm in diameter. They pass through this grill so to speak at one go under the violent propulsion effect applied by the coaxial set of rotating blades which are rotated at approximately 360 r.p.m.

The granules thus produced have an apparent density of approximately 500 g/l. They flow freely and retain this property even after a prolonged residence time at ambient temperature. They are dispersible in boiling water and enable thickened sauces and soups to be readily prepared.

More particularly, they may be used for thickening stocks for cooking meat, poultry, fish and vegetables, for preparing thickenings for ragouts or vegetable stews or for seasoning white or cream sauces and soups based on milk, stock or water for example.

For these applications, for example, 70 g or 100 g granules per liter boiling liquid—depending on whether a soup or a sauce is to be prepared—may simply be dispersed with a whisk and then left standing for about 5 minutes with occasional stirring.

We claim:

1. A process for preparing a granular food product comprising heating a fat to obtain a molten fat, mixing the molten fat and an amylaceous material to obtain a mixture of the fat and material, extruding the mixture to obtain extruded strands, conveying and cooling the strands on a first conveyor belt to harden the strands, dropping the hardened strands from the first conveyor belt onto a second conveyor belt to subdivide the hardened strands into sections and projecting the sections through a grill to obtain granules.

2. A process according to claim 1 wherein the amylaceous material and the fat are mixed in a ratio by weight of material to fat of from about 75:25 to 50:50.

3. A process according to claim 1 wherein the amylaceous material is a cereal flour and the fat has a clear point of from about 35° C. to 50° C.

4. A process according to claim 2 wherein the amylaceous material is a cereal flour and the fat has a clear point of from about 35° C. to 50° C.

5. A process according to claim 4 wherein the amylaceous material is a wheat flour.

6. A process according to claim 5 wherein the wheat flour has a residual moisture content of from 3% to 10%.

7. A process according to claim 6 wherein the fat is selected from the group consisting of a peanut fat and a palm fat.

8. A process according to claim 1 wherein the sections are size-reduced to cylindrical granules having a diameter of from 1 mm to 5 mm and a length of from 2 mm to 10 mm.

9. A process according to claim 2 wherein the mixture is extruded to form cylindrical strands having a diameter of from 3 mm to 10 mm, the strands are subdivided into sections having a length of from 5 cm to 10 cm and the sections are size-reduced to cylindrical granules having a diameter of from 1 mm to 5 mm and a length of from 2 mm to 10 mm.

10. A process according to claim 1 wherein the strands are cooled with liquid nitrogen.

11. A process according to claim 1 wherein the extruded strands are cooled on the first conveyor belt by sprinkling them with liquid nitrogen.

12. A process according to claim 1 wherein the grill has a cylindrical shape and the strands are projected through the grill by rotating a set of coaxially positioned blades contained within the grill.

13. A process according to claim 1 wherein the amylaceous material and the fat are mixed in a ratio by weight of material to fat of from 75:25 to 50:50, wherein the fat has a clear point of from 35° C. to 50° C. and is heated to a temperature of from 50° C. to 60° C., wherein the strands are cooled to a temperature of from 30° C. to 34° C., wherein the mixture is extruded to form cylindrical strands having a diameter of from 3 mm to 10 mm, wherein the strands are subdivided into sections having a length of from 5 cm to 10 cm, and wherein the sections are size-reduced to cylindrical granules having a diameter of from 1 mm to 5 mm and a length of from 2 mm to 10 mm.

14. A process according to claim 13 wherein the amylaceous material is wheat flour which has a moisture content of from 3% to 10%.

* * * * *